GEORGE S. CHRISTIE.
INVENTOR
BY W. Hoyt Young
ATTORNEY

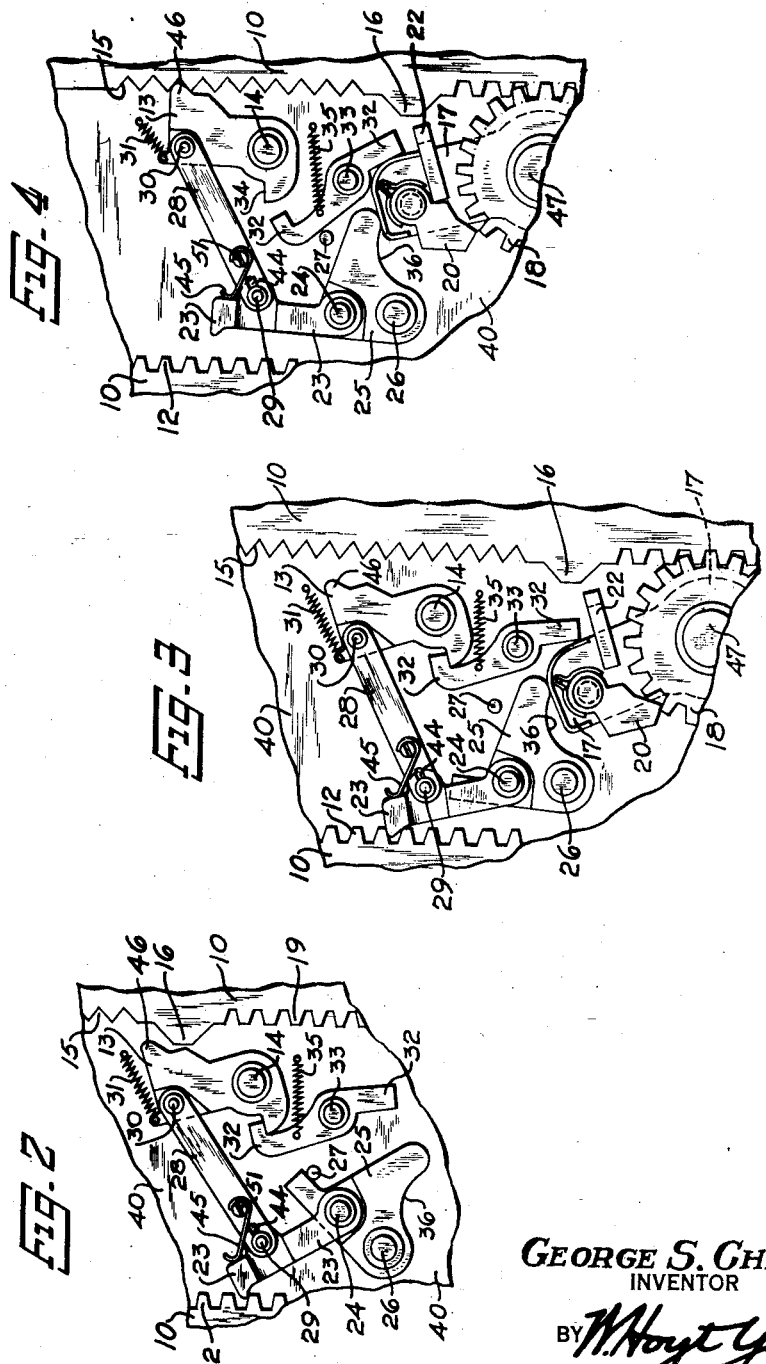

April 14, 1942.                G. S. CHRISTIE                2,279,444
                              CALCULATING MACHINE
                              Filed July 1, 1940            3 Sheets-Sheet 3

GEORGE S. CHRISTIE.
INVENTOR
BY W. Hoyt Young
ATTORNEY

Patented Apr. 14, 1942

2,279,444

UNITED STATES PATENT OFFICE 2,279,444

CALCULATING MACHINE

George S. Christie, Paterson, N. J.

Application July 1, 1940, Serial No. 343,324

14 Claims. (Cl. 235—137)

This invention relates to adding or calculating machines. The general object of the device is to provide a novel mechanical principle for accumulating totals. One of the novel basic features of the device is the mechanical means for transferring the total ten resulting from the addition of the numbers in any one column to the next adjacent column at the left. In other words when the sum of the numbers in the units column of figures is ten or more, that ten is transferred to the tens column as a one. A total of ten in the tens column would in turn be transferred to the hundreds column as a one, and so on with each additional column.

The general object of my invention is to accomplish that purpose by means of a device employing a plurality of racks which are raised mechanically a distance equivalent to the number added during addition and then dropped during transfer a distance equal to ten, which drop actuates a transfer mechanism for setting up a one on the next adjacent rack.

By providing such a mechanism with racks in place of gears the complete unit may be made of negligible thickness. Consequently by providing a series of such units a great number of totals may be calculated on a comparatively small compact machine.

In the drawings:

Figs. 2, 3 and 4 illustrate the positions of the elements of the mechanism at three stages of the transfer operation.

Figure 1:
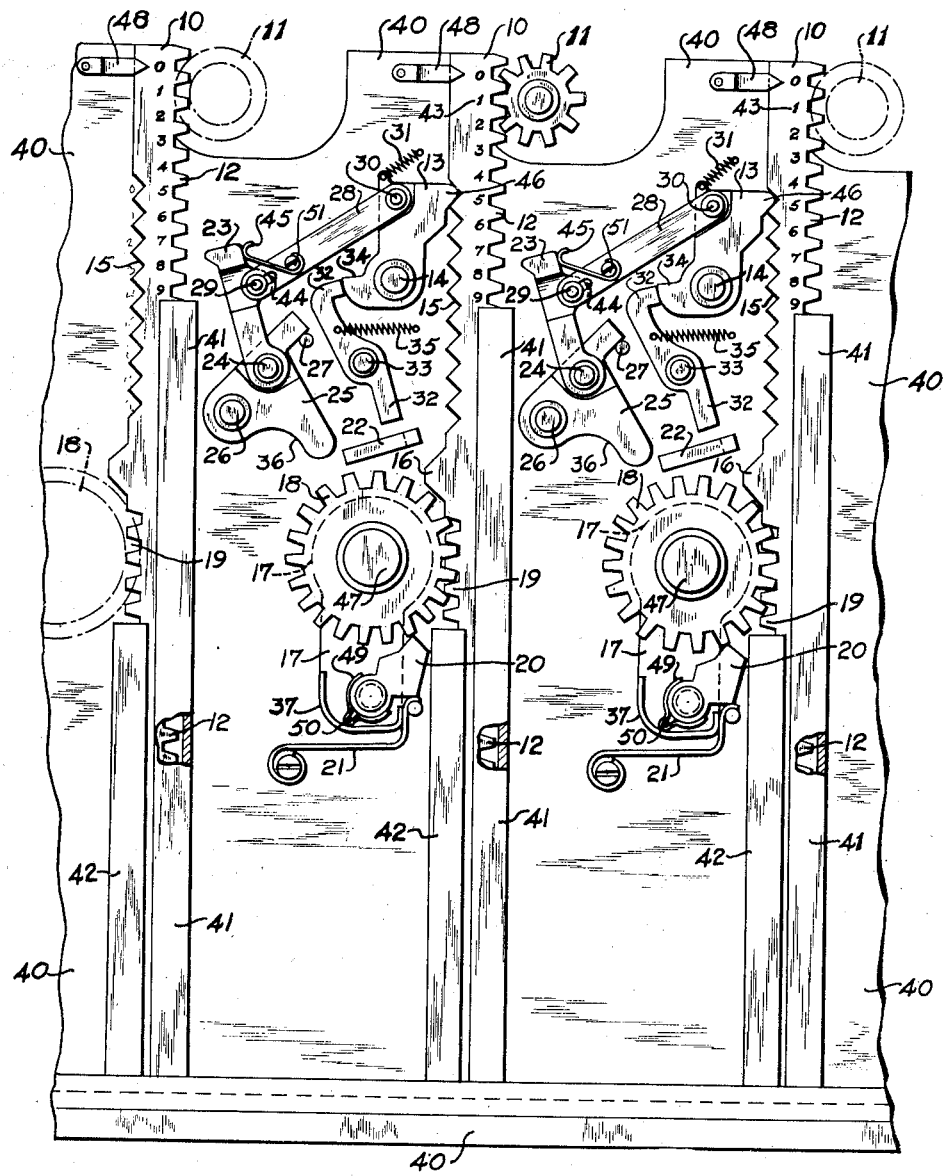
Fig. 1 is a front elevational view of the mechanism.
Figure 5:
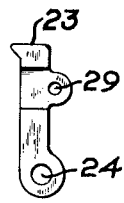
Figs. 5 and 6 are front and side elevational views respectively of the transfer finger.
Figure 6:
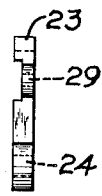
Figure 7:
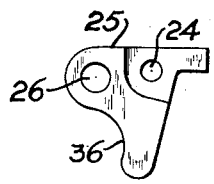
Figs. 7 and 8 are front and side elevational views respectively of the raising link.
Figure 8:
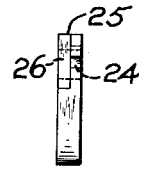
Figure 9:
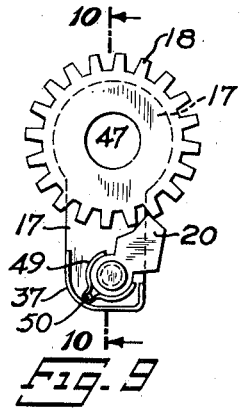
Fig. 9 is a front elevational view of the combination including the transfer arm, gear, and pawl.
Figure 10:
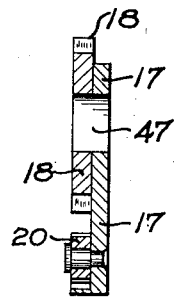
Fig. 10 is a section on line 10 of Fig. 9.
Figure 11:
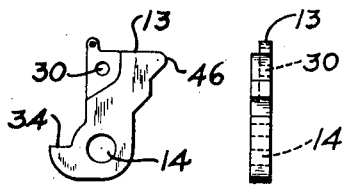
Figs. 11 and 12 are front and side elevational views respectively of the catch.
Figure 12:
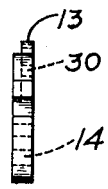
Figure 13:
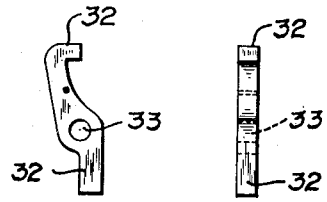
Figs. 13 and 14 are front and side elevational views respectively of the keeper.
Figure 14:
Figure 15:
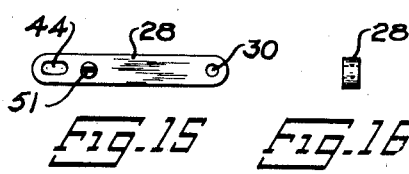
Figs. 15 and 16 are front and side elevational views respectively of the release.
Figure 16:
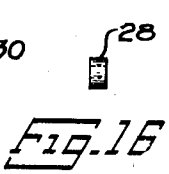

In Fig. 1 two complete transfer mechanisms are illustrated combined for accumulating a total. The rack bar 10 at the right is actuated for adding units; the next bar to its left is for the tens column, the third for the hundreds column and so on the number of transfer mechanism employed depending upon the number of columns of figures to be added. If two or more totals are to be accumulated the device shown in Fig. 1 would be duplicated for each additional total desired, the second device being located directly behind the one shown.

No claim is made in my invention to the standard keyboard and mechanism for actuating the gear 11. And further, although I have shown means for utilizing my device as a simple adding machine wherein I have merely placed a series of numbers on each bar 10 with an arrow or indicator, I intend to employ any of the present suitable mechanical devices for storing those totals accumulated by the bars 10 of the proposed device.

The mechanism comprises a frame 40 including a series of sliding rack bars 10 held in position by guides 41 and 42. On the right side of the bar 10 a driven rack provided with teeth 12 is shown in mesh with the driving gear 11. The entire mechanism, except gears 11, is mounted on frame 40. The frame 40 is slidably mounted in a track or groove or so that it may be moved to the left when a transfer is made in order to disengage the driven rack teeth 12 of bars 10 from gears 11.

On the left side of bar 10 a series of number notches 15 are provided. A catch 13 is provided with tooth 46 which is adapted to enter these notches 15 and retain the bar 10 in its raised position. At the bottom of said series of notches 15 a transfer tooth 16 is located. The purpose of tooth 16 is to disengage catch 13 from notches 15 when the bar 10 has been raised a distance equal to or greater than ten so that the bar 10 is free to drop for performing the transfer operation.

Below teeth 16 on the left side of the bar 10, a transfer or driving rack with teeth 19 is provided. The driving rack teeth 19 are adapted to mesh with the twenty tooth transfer arm driving gear 18. As the bar 10 drops the rack teeth 19 drive the gear 18 which in turn raises the arm 17 for actuating the transfer mechanism. At either side of the lower portion of the bar 10 guides 41 and 42 are provided. These guides are angles with one leg fastened to the frame 40 and the other leg merely extended over the face of the bar 10, for providing a channel or track in which the bars 10 are free to slide.

A rack bar catch 13 is pivoted at 14 to the frame 40 and provided with a tooth 46, which is adapted to catch in the notches 15 and hold the bar 10 from falling. Said catch 13 is normally held in engagement with notches 15 by means of spring 31. The catch 13 is connected to the transfer finger 23 by the linkage 28 through pivots 29 and 30. A slot 44 is provided in link 28 in which the pivot 29 may slide to the right. The pivot 29 is normally held in the left end of slot 44 by means of spring 45. When the finger 23 is raised by linkage 25 a positive driving contact is made between said finger 23 and the driven rack teeth 12 for raising the bar 10. The purpose of the slotted type connection (29, 44) is to allow the left hand rack bar 10 to be raised directly by gear 11 without interference of the engagement of finger 23 with teeth 12; in this operation the finger 23 moves to the right due to its slotted connection and is returned to its normal engaging position by spring 45.

A gear 18 and transfer arm 17 are pivoted on the axis 47 to the frame 40. The said gear 18 is adapted to mesh with and be driven by the driving rack teeth 19 of the rack bar 10. The finger 23 is pivoted at 24 to the transfer finger raising linkage 25 which in turn is pivoted at 26 to the frame 40. A stop 27 is provided to prevent the linkage 25 from dropping below its normal position. The keeper 32 is pivoted to the frame 40 at point 33 and adapted to engage with the lip 34 of the catch 13 when the said catch is rotated counter-clockwise about its pivot 14 as shown in Figs. 2 and 3.

The gear 18 is free to rotate in a counter-clockwise direction about the axis 47 during addition when the right hand rack bar 10 is raised. When the right hand rack bar 10 is dropped ten digits during the operation of transferring the tens to the adjacent bar 10 at the left, it imparts a clockwise rotation to the gear 18 which motion is communicated in unison to the arm 17 by means of pawl 20 engaging with the teeth of said gear 18. The arm 17 is thereby rotated clockwise and continues until it impinges against the release 22, which acts as a stop and terminates the swing of the arm. The pawl 20 contacts the release 22 at approximately the same time thereby disengaging the pawl 20 from the teeth of gear 18 which allows the arm 17 to fall (free of gear 18) in a counter-clockwise direction to its normal position (Fig. 1). The purpose of spring clip 49 which is pivoted or fastened to arm 17 at point 50, is to frictionally hold the pawl in either its engaged or disengaged position during the swinging of arm 17. As the arm 17 drops and approaches its lower position (Fig. 1), the pawl 20 is forced upward by spring 21 until it reengages with the teeth of the gear 18, and is thereby set for subsequent transfers.

*Operation*

At the start of the operation the transfer mechanism is positioned as illustrated in Fig. 1. The positions of the transfer mechanism at other phases of the operation are illustrated in Figs. 2 to 4 inclusive.

When the digit key of the adding machine representing the number "four" in a column of figures is pressed, the gear 11 is revolved in a clockwise direction and through its contact with the rack teeth 12, raises the bar 10 a distance equivalent to four digits. This operation actuates the accumulating or detent means whereby tooth 46 of catch 13 enters the fifth notch 15 from the top (the upper notch representing zero) and locates the number "four" of the column of numbers (43) opposite the pointer 48 of the right hand bar 10. If the next digit key pressed were an "eight" whereby the total would be "twelve," the gear 11 would raise the bar an additional eight digits. After all the numbers have been set up by pressing the necessary keys, the operating mechanism is set in motion manually. In this device, that operation would move the frame 40 to the left, thereby momentarily disengaging rack teeth 12 from gear 11. The bars 10 would then be free to drop thereby operating the transfer mechanism for transferring the ten digits to the left hand bar 10. Although the weight of the dropping rack bars 10 is sufficient for actuating the simple transfer mechanism disclosed, spring assists or additional weights may be added to the rack bars for increasing the force for operating the transfer mechanism if necessary. If each of the bars accumulates a number totaling less than ten the shifting of the frame 40 to the left has no effect on the device since tooth 46 of catch 13 would remain in engagement with notches 15.

When ten or more digits have been accumulated on any rack bar a disengaging means releases the accumulating or detent means in order to free the rack bar for operating the transfer mechanism. As the right hand rack bar 10 is raised to the total "twelve" ("four" plus "eight") the transfer or disengaging tooth 16 would force catch 13 to the left out of engagement with notches 15 whereby the transfer mechanism would be positioned as shown in Fig. 2. The movement of the catch 13 to the left is communicated through the link 28 to the finger 23 which in turn engages with one of the driven rack teeth 12 of the rack bar representing the tens in the column of numbers. During this operation, as the catch 13 is rotated counter-clockwise about its pivot 14, the keeper 32 will engage with lip 34, and retain the catch 13 in the above mentioned position. At the same time linkage 28 would retain finger 23 in engagement with the teeth 12 of rack bar 10. Due to the slotted connection (29, 44) between finger 23 and link 28 and the pressure of spring 45 against finger 23, the finger is normally urged toward rack teeth 12. Therefore when the finger 23 is positioned as illustrated in Fig. 2 and the finger is raised by link 25, the rack will in turn be raised as shown in Fig. 3 due to the positive contact. However, at the same time when the finger and rack are engaged as shown in Fig. 2, the finger may be rocked sidewise in its slotted connection so that the rack may be raised independently and without interference from the finger 23.

The next step is to operate the device manually for transferring the "ten" from the total "twelve" of the right hand rack to the adjacent left hand rack. This is accomplished by sliding the entire frame 40, including the complete mechanism except gears 11, to the left so that the rack teeth 12 on each bar 10 are thrown out of engagement with the gears 11. Upon the release of the rack teeth 12 from gears 11, all rack bars 10 not held by tooth 46 of catch 13 will drop. That is, when transfer tooth 16 has forced catch 13 to the left out of engagement with notches 15, the rack bar 10 is free to drop as shown in Fig. 2. Since driving rack teeth 19 are in engagement with gear 18, as the rack bar 10 drops it rotates gear 18, which in turn rotates arm 17 clockwise until the nose 37 of the arm 17 comes against the curved side 36, of the raising link 25. The impact of the arm 17, in addition to the forces of gravity or spring tension acting on the rack bar 10 actuates the link 25, which in turn raises the finger 23 and the rack bar 10 at the left a distance equivalent to one digit in the tens column. At this point the positions of the elements of the transfer mechanism are illustrated in Fig. 3.

The arm 17 continues in its clockwise direction and contacts the keeper 32. This disengages said keeper from the lip 34 of catch 13 thereby permitting the tooth 46 to enter the third notch 15 representing the number "two" of the rack bar 10 on the extreme right. As catch 13 reengages with rack bar 10 at the right it releases finger 23 from engagement with rack bar 10 at the left. This stage of the operation is illustrated in Fig. 4.

Directly thereafter pawl 20 strikes release 22 which disengages the tip of the pawl 20 from the teeth of gear 18. At approximately the same time arm 17 impinges against release 22 which terminates the rotation of the arm. The disengagement of pawl 20 from the teeth of the gear 18 permits the arm 17 to fall in a counterclockwise direction free of gear 18 to its original position as shown in Fig. 1. As the arm 17 approaches this position spring 21 forces pawl 20 to reengage with the teeth of gear 18.

In the above description I have described my invention as including the driving gears 11 coupled to a standard key board for raising the various rack bars. A very simple, although crude method for accomplishing this operation would be to count downward a number of teeth 12 below the pointer 48 equal to the number to be set up or added. Then insert a pencil point at that tooth and raise the rack manually. When the pencil is opopsite pointer 48 the pencil may be removed. The removal of the pencil corresponds to the operation of shifting the frame to the left for disengaging the bars and gears 11 for transfer.

I claim:

1. A device of the type described comprising, a plurality of rack bars one for each column of digits to be added, means for independently raising the respective rack bars distances equal to the value of the digits added in the column, detent means for temporarily retaining each rack bar in its raised position representing an accumulation of the distances raised and equal to the value of the sum of the digits added, disengaging means for freeing said detent means from its rack bar when the sum of the digits added on that rack bar is equal to or greater than ten, whereby said rack bar may drop free of said detent means, and a transfer mechanism operated by said rack bar for limiting said drop to a distance equal to ten digits and raising the adjacent rack bar of higher order a distance equal to one digit.

2. A device of the type described comprising a plurality of rack bars one for each column of digits to be added, means for independently raising the respective rack bars distances equal to the value of the digits added in the column, detent means including a series of notches in combination with a catch engaging in said notches on each rack bar for temporarily retaining each rack bar in its raised position representing an accumulation of the distances raised and equal to the value of the sum of the digits added, disengaging means for freeing said detent means from its rack bar when the sum of the digits added on that rack bar is equal to or greater than ten, whereby said rack bar may drop free of said detent means, and a transfer mechnism operated by said rack bar for limiting said drop to a distance equal to ten digits and raising the adjacent rack bar of higher order a distance equal to one digit.

3. A device of the type described comprising a plurality of rack bars one for each column of digits to be added, means for independently raising the respective rack bars distances equal to the value of the digits added in the column, detent means including a series of notches in combination with a catch engaging in said notches on each rack bar for temporarily retaining each rack bar in its raised position representing an accumulation of the distances raised and equal to the value of the sum of the digits added, a transfer tooth on each rack bar adapted to disengage said catch from said notches when the sum of the digits added on that rack bar is equal to or greater than ten, whereby said rack bar may drop free of said detent means, and a transfer mechanism operated by said rack bar for limiting said drop to a distance equal to ten digits and raising the adjacent rack bar of higher order a distance equal to one digit.

4. A device of the type described comprising a plurality of rack bars one for each column of digits to be added, means for independently raising the respective rack bars distances equal to the value of the digits added in the column, detent means including a series of notches in combination with a catch engaging in said notches on each rack bar for temporarily retaining each rack bar in its raised position representing an accumulation of the distances raised and equal to the value of the sum of the digits added, a transfer tooth on each rack bar adapted to disengage said catch from said notches when the sum of the digits added on that rack bar is equal to or greater than ten, whereby said rack bar may drop free of said detent means, a transfer mechanism operated by said rack bar for limiting said drop to a distance equal to ten digits and raising the adjacent rack bar of higher order a distance equal to one digit, and a keeper for retaining the catch out of engagement with said notches until the transfer has been completed.

5. A device of the type described comprising, a plurality of rack bars one for each column of digits to be added, means for independently raising the respective rack bars distances equal to the value of the digits added in the column, detent means for temporarily retaining each rack bar in its raised position representing an accumulation of the distances raised and equal to the value of the sum of the digits added, disengaging means for freeing said detent means from its rack bar when the sum of the digits added on that rack bar is equal to or greater than ten, whereby said rack bar may drop free of said detent means, and a transfer mechanism operated by said rack bar and including means for limiting the drop of the rack bar to a distance equivalent to ten digits.

6. A device of the type described comprising a plurality of rack bars one for each column of digits to be added, means for independently raising the respective rack bars distances equal to the value of the digits added in the column, detent means for temporarily retaining each rack bar in its raised position representing an accumulation of the distances raised and equal to the value of the sum of the digits added, disengaging means for freeing said detent means for its rack bar when the sum of the digits added on that rack bar is equal to or greater than ten, whereby said rack bar may drop free of said detent means, and a transfer mechanism operated by said rack bar including means for reengaging the detent means with its rack bar when the rack bar has dropped a distance equivalent to ten digits.

7. A device of the type described comprising a plurality of rack bars one for each column of digits to be added, means for independently raising the respective rack bars distances equal to the value of the digits added in the column, detent means for temporarily retaining each rack bar in its raised position representing an accumulation of the distances raised and equal to the value of the sum of the digits added, disengaging means for freeing said detent means from its rack bar when the sum of the digits added on that rack bar is equal to or greater than ten, whereby said rack bar may drop free of said detent means, a transfer driving rack on each bar, and a transfer mechanism including a transfer arm, a transfer arm driving gear in mesh with said transfer driving rack and driven thereby as the rack bar drops, a pawl attached to said transfer arm and adapted to engage with the teeth of said driving gear for rotating the arm and gear in unison as the rack bar drops but allow said gear to rotate free of said arm when the gear is driven in the opposite direction as the rack bar is raised, and means actuated by said transfer arm when the rack bar drops a distance equal to the value of ten digits for raising the adjacent rack bar of higher order a distance equal to the value of one digit.

8. A device of the type described comprising a plurality of rack bars one for each column of digits to be added, means for independently raising the respective rack bars distances equal to the value of the digits added in the column, a detent means including a series of notches in combination with a catch engaging in said notches on each rack bar for temporarily retaining each rack bar in its raised position representing an accumulation of the distances raised and equal to the value of the sum of the digits added, disengaging means for freeing said detent means from its rack bar when the sum of the digits added on that rack bar is equal to or greater than ten, whereby said rack bar may drop free of said detent means, a transfer mechanism including a finger and operative means for raising the adjacent rack bar of higher order a distance equal to one digit, and a linkage connecting said finger and said catch whereby the disengagement of said catch from the notches causes the finger to engage with the teeth of the driven rack on the adjacent rack bar of higher order and the reengagement of the catch with said notches disengages the finger from said teeth of said driven rack.

9. A device of the type described comprising a plurality of rack bars and means for raising one or more of said bars independently, detent means for temporarily retaining each rack bar in its raised position, disengaging means for freeing said detent means from its rack bar, and a transfer mechanism including means for limiting the drop of a rack bar to a distance equal to ten digits, in combination with means for raising the adjacent rack bar of higher order a distance equal to one digit.

10. The combination set forth in claim 9 including a detent means characterized by a spring actuated catch adapted to temporarily hold the rack bar in its raised position without interfering with the operation of independently raising the rack bar.

11. The combination set forth in claim 9 including, a detent means characterized by a spring actuated catch adapted to temporarily hold the rack bar in its raised position without interfering with the operation of independently raising the rack bar, a rack transfer tooth on each rack bar adapted to disengage said catch from said rack bar when the rack bar has been raised a distance equal to or greater than ten digits, and a keeper for retaining said catch out of engagement with the rack bar until the transfer has been completed.

12. The combination set forth in claim 9 including a transfer mechanism characterized by a transfer arm and a gear journalled on a shaft, said gear being in mesh with rack teeth on said rack bar and adapted to be driven thereby, a pawl pivoted to said transfer arm and adapted to engage with said gear for rotating the arm and gear in unison as the rack bar drops, and a raising finger actuated by the rotation of said transfer arm and adapted to mesh with the adjacent rack bar of higher order for raising said rack bar one digit.

13. A device of the type described comprising a plurality of rack arms and means for raising one or more of said bars independently, detent means for temporarily retaining each rack bar in its raised position, disengaging means for freeing said detent means from its rack bar, a transfer mechanism including means for limiting the drop of a rack bar to a distance equal to ten digits, in combination with means for raising the adjacent rack bar of higher order a distance equal to one digit, a detent means characterized by a spring actuated catch adapted to temporarily hold the rack bar in its raised position without interfering with the operation of independently raising the rack bar, a rack transfer tooth on each rack bar adapted to disengage said catch from said rack bar when the rack bar has been raised a distance equal to or greater than ten digits, a keeper for retaining said catch out of engagement with the rack bar until the transfer has been completed, a transfer mechanism characterized by a transfer arm and a gear journalled on a shaft, said gear being in mesh with rack teeth on said rack bar and adapted to be driven thereby, a pawl pivoted to said transfer arm and adapted to engage with said gear for rotating the arm and gear in unison as the rack bar drops, a raising finger actuated by the rotation of said transfer arm and adapted to mesh with the adjacent rack bar of higher order for raising said rack bar one digit, and a linkage connecting the catch and raising finger whereby disengagement of the catch from its rack bar forces the raising finger into driving engagement with its rack, a linkage connecting the catch and raising finger whereby disengagement of the catch from its rack bar forces the raising finger into driving engagement with its rack.

14. The combination set forth in claim 13 including a slotted connection between the raising finger and said linkage in combination with a spring adapted to normally hold said finger in the left end of said slot, thereby providing a positive driving relation from the finger to the rack without the finger hindering the rack bar from being raised independently.

GEORGE S. CHRISTIE.